United States Patent [19]

Hosaka et al.

[11] Patent Number: 4,754,611

[45] Date of Patent: Jul. 5, 1988

[54] CONTROLLED ATMOSPHERE STORAGE SYSTEM

[75] Inventors: Masato Hosaka, Osaka; Atsushi Nishino, Neyagawa; Jiro Suzuki, Nara; Jun Takeda; Takeshi Shimizu, both of Yao; Hiroshi Hamamoto, Osaka, all of Japan

[73] Assignee: Matsushita Electric Industrial Co., Ltd., Kadoma, Japan

[21] Appl. No.: 113,766

[22] Filed: Oct. 28, 1987

[30] Foreign Application Priority Data

| Oct. 31, 1986 | [JP] | Japan | 61-261309 |
| Oct. 31, 1986 | [JP] | Japan | 61-261310 |
| Oct. 31, 1986 | [JP] | Japan | 61-261311 |
| Nov. 6, 1986 | [JP] | Japan | 61-264593 |
| Nov. 7, 1986 | [JP] | Japan | 61-266039 |

[51] Int. Cl.[4] .............................................. F24F 3/16
[52] U.S. Cl. ................................. 62/78; 426/314; 426/419
[58] Field of Search ..................... 62/78; 426/314, 419

[56] References Cited

U.S. PATENT DOCUMENTS

| 3,102,779 | 9/1963 | Brody et al. | 62/78 |
| 3,102,780 | 9/1963 | Bedrosian et al. | 62/78 |
| 3,313,631 | 4/1967 | Jensen | 426/419 |
| 3,345,181 | 10/1967 | Smith, Jr. | 426/314 |

Primary Examiner—Ronald C. Capossela
Attorney, Agent, or Firm—Wenderoth, Lind & Ponack

[57] ABSTRACT

A controlled atmosphere storage system which is so arranged that a refrigerator and a carbon dioxide generator are connected to each other, and a purifying catalyst, an air preheater, a cooler, a circulating blower and a scrubber are disposed at the downstream side in that order, with the scrubber and the refrigerator being connected, whereby time required for stabilization of combustion may be reduced as compared with conventional systems, and combustion under a low oxygen concentration can be maintained, while flow-out of controlled atmosphere gas outside the refrigerator or entry of atmosphere into the refrigerator can be prevented. Moreover, by forming the carbon dioxide generator in a double wall construction to fill a space with air containing carbon dioxide, heat insulating property is improved for facilitation of combustion under a lower oxygen concentration than in the conventional systems. Furthermore, at starting, since combustion is effected through employment of suction and exhaust paths different from the circulating path, pipe walls are protected against corrosion, and re-ignition under a low oxygen concentration is made possible.

7 Claims, 4 Drawing Sheets

CONTROLLED ATMOSPHERE STORAGE SYSTEM

BACKGROUND OF THE INVENTION

The present invention generally relates to a storage system and more particularly, to a controlled atmosphere storage system which is utilized in the field of storing perishable foodstuffs such as fruit, vegetables, etc. as a storing system for suppressing breathing action or respiration, and activities of microbes, enzyme, etc. through adjustments of composition of air in the atmosphere in which the perishables are placed.

Conventionally, the controlled atmosphere storage system (referred to as CA storage system hereinafter) as described above is so arranged that fuel fed from a container such as a cylinder or the like is mixed with air supplied from a refrigerator by a circulating blower so as to be burnt in a carbon dioxide generator for generation of carbon dioxide. Since the carbon dioxide generated in the carbon dioxide generator is supplied into the refrigerator, oxygen in the refrigerator is reduced, while carbon dioxide therein is increased. When the concentration of the carbon dioxide reaches a preset value, a scrubber is operated for adsorption of excessive carbon dioxide. Subsequently, upon arrival of the oxygen concentration at the preset value, the carbon dioxide generator is stopped, and an oxygen replenishing blower is operated so as to maintain constant, the composition of air in the atmosphere (referred to as CA gas hereinafter) in which perishable stuffs are placed for storing such perishables under a fresh state.

The known CA storage system as referred to above, however, has such a disadvantage that when a gas fuel of a petroleum group is employed as a fuel therefor, a large amount of water vapor is contained in an exhaust gas, and thus, a very large condenser is required for condensation of such water vapor, undesirably resulting in a large size of the storage system on the whole.

The problem related to the generation of water vapor may be avoided if a solid fuel having a high purity in carbon content is employed for the fuel. However, as compared with the gas fuel of petroleum group, it is difficult for the carbon fuel to maintain proper combustion, unless the temperature of a burning section is kept at a high level. Moreover, as the combustion proceeds, concentration of oxygen within the refrigerator is lowered, with a consequent reduction of the amount of oxygen to be used for the combustion, and therefore, the amount of air to be fed to the carbon fuel must be increased in order to maintain the fuel consumption, and it becomes difficult to maintain the burning section at high temperatures. In other words, it becomes impossible to keep the temperature at which the carbon fuel can maintain the combustion, unless heat recovery and heat insulation at the burning section are improved. However, if it is intended to maintain the temperature by winding the insulating material in many layers, there may be invited such problems that, not only the weight of the system is increased due to the increase in the amount of insulating material used, but also a long time is required for the preheating before ignition and stabilization of the combustion owing to an increase in the heat capacity.

Additionally, in the case where re-ignition is to be effected from a state in which the oxygen concentration in the refrigerator is low, if it is intended to carry out the combustion at the similar combustion rate to that when the oxygen concentration is normal, the circulating air amount immediately after the starting of burning becomes very large. Accordingly, there also arises such a problem that, even when the carbon fuel is particularly heated up to a temperature capable of burning, it is undesirably cooled by the circulating air, thus being unable to start the combustion.

Meanwhile, although not limited to the CA storage system as referred to above, a certain degree of temperature adjusting width is generally involved if it is intended to maintain the temperature within a refrigerator at a present level. In this case, in a system in which the air-tightness of the refrigerator is very high as in the CA storage system, a large increase or decrease of pressure is produced within the refrigerator by the temperature adjusting width as described above. Therefore, in the CA storage system, a breather bag is employed for absorbing the increase or decrease of pressure in the refrigerator so as to adjust the pressure within the refrigerator, thereby to prevent the outflow of CA gas from the refrigerator or entry of atmosphere into said refrigerator.

However, in the above case, there may arise such a problem that, depending on the position of a circulating blower provided in a circulating path, the interior of the refrigerator is undesirably subjected to a positive pressure or negative pressure, and it becomes difficult to absorb the increase or decrease of pressure due to the temperature adjusting width within the refrigerator by the breather bag, thus resulting in the outflow of the CA gas from the refrigerator or entry of atmosphere thereinto. Particularly, with respect to this problem, in the case where the oxygen concentration within the refrigerator is low, for example, when the oxygen concentration is, at 2% (i.e. 1/10 of the oxygen amount in the atmosphere) the influence of the blowing pressure by the circulating blower is brought into serious question, since the amount of circulating air to be supplied must be 10 times that in the case of the atmosphere.

SUMMARY OF THE INVENTION

Accordingly, an essential object of the present invention is to provide an improved CA storage system which is capable of eliminating disadvantages in the conventional CA storage systems as described above.

Another important object of the present invention is to provide a CA storage system of the above described type which is simple in construction and accurate in functioning at high reliability, and can be readily constructed at low cost.

In accomplishing these and other objects, according to one preferred embodiment of the present invention, there is provided a controlled atmosphere storage system which includes a refrigerator, a carbon dioxide generator which burns a carbon fuel by a burning section provided therein for supplying carbon dioxide to the refrigerator, a purifying catalyst provided at the downstream side of the carbon dioxide generator, an air preheater provided at the downstream side of the purifying catalyst, a cooler provided at the downstream side of the air preheater, a circulating blower provided at the downstream side of the cooler for circulating air within the refrigerator, as air for combustion, into the carbon dioxide generator, a scrubber provided at the downstream side of the circulating blower for adjusting concentration of carbon dioxide by adsorbing the carbon dioxide for supplying into the refrigerator, and a circulating path which connects the scrubber and the refrigerator.

By the arrangement according to the present invention as described above, the temperature within the burning section or burning furnace is quickly stabilized for reduction of time required for stabilization of combustion to a large extent, while the combustion may be maintained under a low concentration of oxygen.

Moreover, lowering of temperature of the carbon fuel due to the combustion air may be limited to the minimum for making it possible to re-ignite under the state of a low oxygen concentration.

Furthermore, it becomes possible for the breather bag to fully perform its function, thus preventing the outflow of the CA gas from the refrigerator or entry of the atmosphere into said refrigerator.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
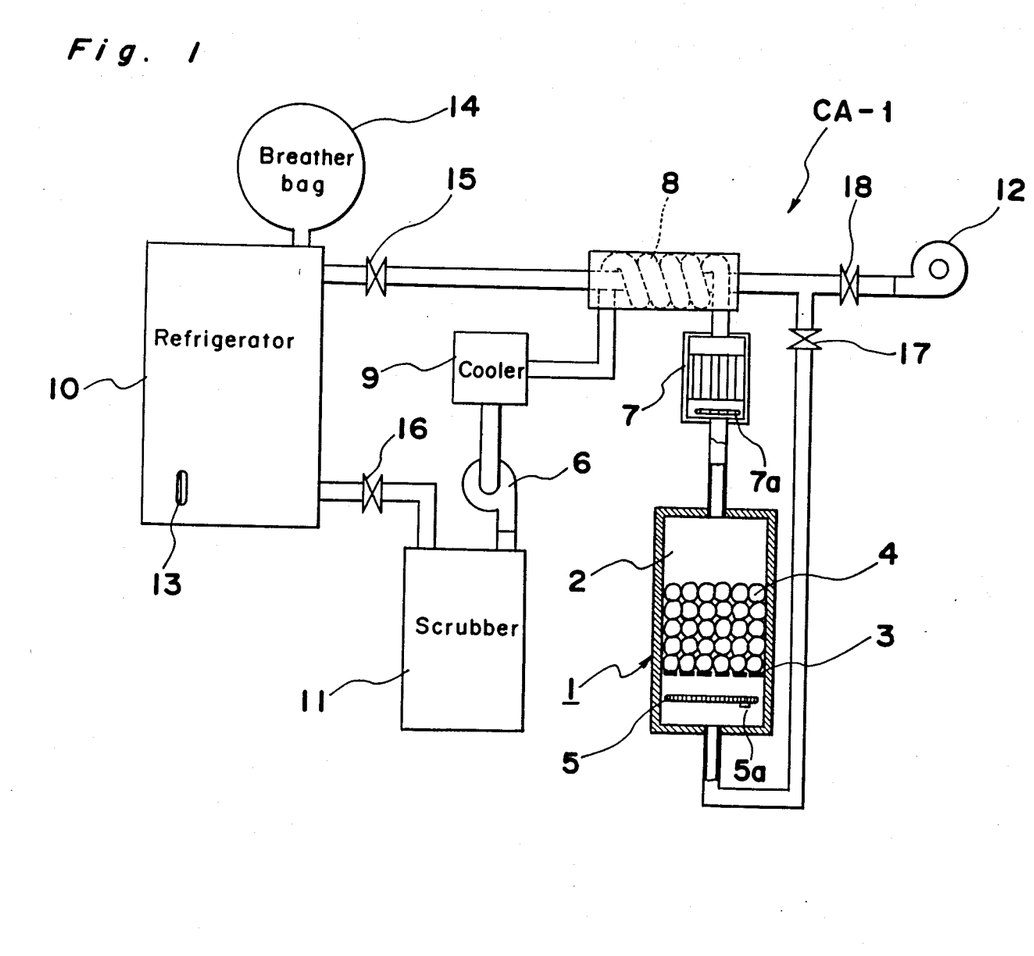
FIG. 1 is a schematic diagram, partly in section, showing a general construction of a CA storage system according to one preferred embodiment of the present invention.

Referring now to the drawings, there is shown in FIG. 1 a controlled atmosphere or CA storage system CA-1 according to one preferred embodiment of the present invention, which generally includes a refrigerator 10, a carbon dioxide generator 1 which burns a carbon fuel 4 by a burning section 2 provided therein for supplying carbon dioxide to the refrigerator 10, a purifying catalyst 7 provided at the downstream side of the carbon dioxide generator 1, an air preheater 8 provided at the downstream side of the purifying catalyst 7, a cooler 9 provided at the downstream side of the air preheater 8, a circulating blower 6 provided at the downstream side of the cooler 9 for circulating air within the refrigerator 10, as air for burning, into the carbon dioxide generator 1, a scrubber 11 provided at the downstream side of the circulating blower 6 for adjusting concentration of carbon dioxide by adsorbing the carbon dioxide for supplying into the refrigerator 10, and a circulating path which connects the scrubber 11 and the refrigerator 10.

In the arrangement of FIG. 1, a grate 3 is provided so as to partition the burning section or burning furnace 2 of the carbon dioxide generator 1, with the carbon fuel 4 having a high carbon purity being fed onto said grate 3. An electric heater 5 is provided below the grate 3 so as to be energized at starting, and upon heating up to the temperature sufficient for the carbon fuel 4 to burn, the circulating blower 6 is operated for supplying air for the combustion into the burning furnace 2. In the above case, valves 15, 16 and 17 are opened, with a valve 18 being closed. Since the carbon fuel 4 has already been sufficiently heated, burning is started as soon as air contacts the carbon fuel 4. In this case, the burning amount is to be determined by the surface area of the carbon fuel 4 and the amount of oxygen supplied to the carbon fuel 4.

An exhaust gas at high temperature generated by the carbon dioxide generator 1 and containing a large amount of carbon dioxide, preheats the air for combustion at the air preheater 8 after being purified at the purifying catalyst 7, and is then cooled by the cooler 9 so as to be fed into the refrigerator 10. Thus, the air reduced in its oxygen concentration by the above process is again supplied into the burning furnace 2 by the circulating blower 6. Such a cycle is continued until the concentration of carbon dioxide within the refrigerator 10 reaches a preset value.

When the carbon dioxide concentration in the refrigerator 10 has reached the preset value, the scrubber 11 is operated for adsorption of excessive carbon dioxide above the preset value for adjustment so that the carbon dioxide concentration within the refrigerator 10 becomes the preset value.

Upon arrival of the oxygen concentration within the refrigerator 10 at the preset value, the carbon dioxide generator 1 is stopped. Thereafter, oxygen consumed by the breathing or respiration of the perishable stuffs held in store is replenished by supplying oxygen in the atmosphere into the refrigerator by an oxygen supplying blower 12, while carbon dioxide generated through respiration of the perishables is adsorbed by the scrubber 11, thereby maintaining the air composition within the refrigerator 10 at the preset value continuously.

For feeding oxygen in the atmosphere into the refrigerator 10 by the oxygen supplying blower 12, said blower 12 is operated, with the valve 17 closed and the valves 15 and 18 opened.

Specific functioning of the CA storage system according to one preferred embodiment of the present invention as described so far will be explained in more detail hereinafter.

Burning of the carbon fuel proceeds in such a manner that, upon contact of oxygen with the surface of the carbon fuel, there arises a reaction to produce carbon monoxide through bonding of carbon atoms with oxygen atoms on the surface of the carbon fuel. Subsequently, another reaction in which carbon dioxide is produced through bonding of carbon monoxide with oxygen atoms in the vicinity of the surface of the carbon fuel, takes place in the gaseous phase. Especially, since the latter reaction occurs in a gaseous phase at a high temperature, when the combustion gas in which this reaction is taking place in brought into contact with a portion at a low temperature, the reaction for converting into carbon dioxide is suspended so as to generate carbon monoxide.

Accordingly, burning of the carbon fuel largely depends on the surface area of said carbon fuel and oxygen concentration. Therefore, in the case where air in the refrigerator 10 is to be used for burning through circulation, the oxygen concentration within the refrigerator is lowered as the combustion proceeds, and therefore, the fuel consumption is consequently reduced with the progress of combustion.

According to the present invention, there is provided an oxygen concentration detecting section 13 within the refrigerator 10 for detecting oxygen concentration in said refrigerator, and it is so arranged that the number of revolutions of the circulating blower 6 is controlled by a signal from said detecting section 13, thereby to increase the amount of air to be supplied to the carbon fuel 4. More specifically, if the amount of air to be supplied to the carbon fuel 4 is increased according to the reduction of the oxygen concentration within the refrigerator 10, the oxygen amount to be fed to the carbon fuel 4 is increased, with a consequent increase of the oxygen amount to be employed for the combustion, and therefore, the fuel consumption is increased. In the case where the oxygen concentration in the refrigerator 10 is not very small, there is no problem, since the increasing amount of air is not excessively large, but when the oxygen concentration within the refrigerator 10 becomes small, the increasing air amount is excessively large, with a consequent reduction of the burning temperature of the carbon fuel 4, and thus, it becomes impossible to maintain the combustion only by the heat generation by the carbon fuel 4 itself. Therefore, according to the present invention, it is so arranged as to maintain the combustion of the carbon fuel 4 by the following two methods.

One of the methods is to raise the burning temperature of the carbon fuel by enhancing activity of the combustion air, while the other method is a practice to increase the burning temperature of the carbon fuel by directly raising the temperature of the carbon fuel 4 by the electric heater 5.

According to the present invention, by effecting the two methods as described above, burning of the carbon fuel 4 is made possible even under a low oxygen concentration, and thus, the combustion rate can be held constant irrespective of the progress of the combustion.

In a common burning furnace employing a gaseous fuel, liquid fuel or the like, since its exhaust gas temperature becomes high immediately after the ignition, it is a general practice to provide the air preheater at the direct downstream side of the burning furnace having the high exhaust gas temperature. However, in the case of the burning furnace 2 of the present invention employing the carbon fuel, it is not very preferable to provide the air preheater 8 immediately at the downstream side of the burning furnace 2.

Figure 2:
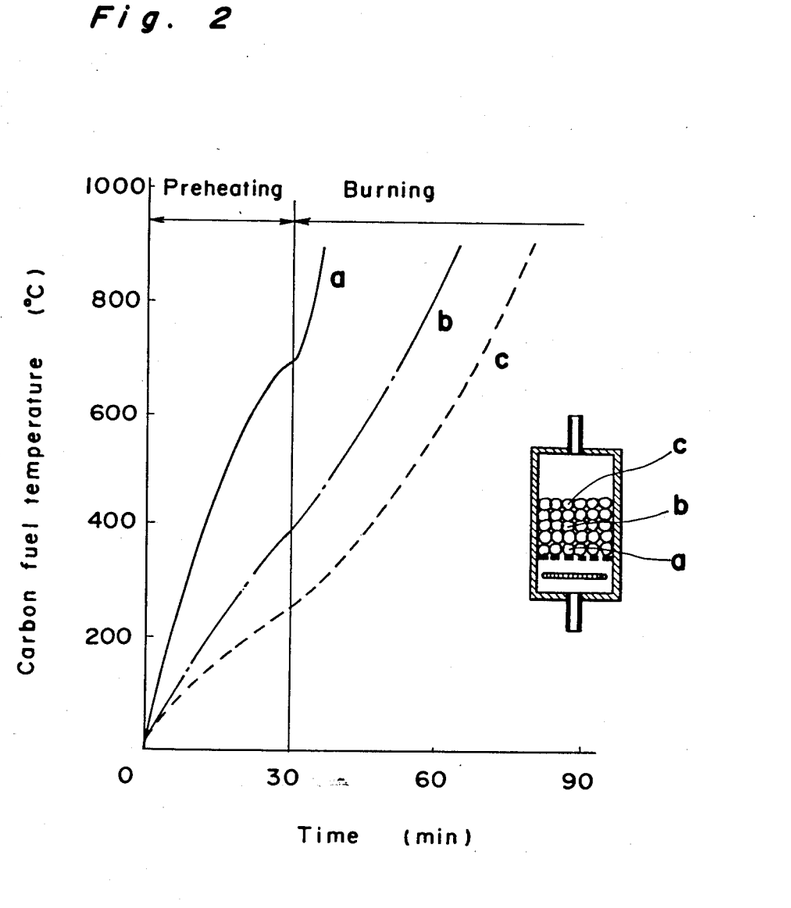
FIG. 2 is a characteristic diagram showing relation between the temperature of the carbon fuel and time.

In FIG. 2, there is shown a diagram representing temperature variations of the carbon fuel 4 from the starting of preheating to a time point immediately after starting of the burning.

In the diagram of FIG. 2, it is seen that, if a large amount of carbon fuel is fed to the burning section, preheating for a very long time is required before preheating all of the carbon fuel in the burning section to a state capable of being burnt. Therefore, if the burning is started by arranging to effect the burning through feeding of the combustion air to the burning section when the lower layer of the carbon fuel 4 has reached the temperature capable of burning, the carbon fuel at the lower portion of the burning furnace 2 (at "a" in FIG. 2) is at the high temperature sufficient for effecting the burning, whereas the carbon fuel at the upper portion of the burning furnace 2 (at "c" in FIG. 2) is very low in temperature, since the heat amount during the preheating is absorbed by an intermediate carbon fuel (at "b" in FIG. 2), and almost no heat amount is supplied during such preheating. Therefore, when the burning gas of the carbon fuel at the lower portion "a" of the burning furnace 2 where the combustion is started, contacts the carbon fuel at a low temperature, the reaction for converting carbon monoxide to carbon dioxide is suspended, and a large amount of carbon monoxide is generated in the burning reaction of the carbon fuel. Particularly, in the case where the carbon fuel sintered at high temperatures is employed as a fuel, the amount of generated carbon monoxide is considerably increased as compared with that of the carbon fuel not subjected to sintering, and time required for stabilization of the burning furnace is also prolonged. In order to suppress the generation of carbon monoxide, it may be arranged to raise the temperature of the carbon fuel at the upper portion of the burning furnace 2 as quickly as possible for stabilization of combustion.

Accordingly, in the present invention, the purifying catalyst 7 is provided at the downstream side of the carbon dioxide generator 1, with the air preheater 8 being further disposed at the downstream side of the catalyst 7, whereby the combustion gas at a low temperature supplied from the burning furnace 2 and containing a large amount of carbon monoxide is heated up to high temperatures by the heat generating reaction in which carbon monoxide is converted into carbon dioxide at the purifying catalyst 7, and if fed into the air preheater 8. Therefore, since the combustion gas to be supplied into the air preheater 8 is heated up to the temperature much higher than that in the conventional systems, the capacity of the air preheater 8 may be derived to the maximum, and thus, the combustion air can be subjected to the heat-exchange at high temperatures by the air preheater 8 so as to be supplied into the burning furnace 2. Owing to the fact that the above combustion air at high temperatures intensifies the burning reaction of the carbon fuel 4, the carbon fuel at the upper portion of the burning furnace 2 is heated to high temperatures in a short period of time for quick stabilization of the temperature within the burning furnace 2, so that time required for the stabilization of combustion may be reduced to a large extent, while the combustion can be contained even under the state of a low oxygen concentration.

Subsequently, the effect by providing the circulating blower 6 between the carbon dioxide generator 1 and the scrubber 11 will be described hereinafter.

When the temperature within the refrigerator 10 rises above the preset value by 1° C., the pressure in the refrigerator 10 is to be increased by approximately 30 to 40 mmAq. Therefore, on the assumption that the temperature adjusting width within the refrigerator 10 is $\pm 1°$ C., the pressure within said refrigerator varies at considerably large values in the range of $\pm 30$ to 40 mmAq as the temperature in the refrigerator 10 varies. In order to absorb such variation in the pressure, in the CA storage system, the breather bag 14 provided on the refrigerator 10 is adapted to continuously repeat expansion and contraction during the refrigeration.

However, depending on the position of the circulating blower 6 provided in the circulating path, the interior of the refrigerator 10 is undesirably subjected to a positive pressure or negative pressure by the influence of the blowing pressure of the circulating blower 6, thus making it difficult to absorb the increase or decrease of the pressure in the refrigerator 10 due to the temperature adjusting width by the breather bag 14. Particularly, since the amount of circulating air increases as the amount of oxygen decreases, the degree for the interior of the refrigerator 10 to be subjected to the positive or negative pressure will also be increased.

By way of example, if the circulating blower 6 is disposed immediately at the upstream side of the refrigerator 10, the interior of the refrigerator 10 is subjected to the positive pressure, and the breather bag 14 remains in the expanded state. Thus since the pressure rise upon rising of the temperature within the refrigerator 10 can not be fully absorbed by the breather bag 14 remaining in the expanded state, the interior of the refrigerator 10 is subjected to the positive pressure and the CA gas undesirably flows out of said refrigerator. Meanwhile, when the circulating blower 6 is provided immediately at the downstream side of the refrigerator 10, the interior of the refrigerator 10 is subjected to the negative pressure, with the breather bag 14 remaining in the contracted state. Thus, due to the fact that the pressure reduction upon falling of the temperature within the refrigerator 10 can not be sufficiently absorbed by the breather bag 14 remaining in the contracted state, the interior of the refrigerator 10 is subjected to the negative pressure, and fresh air undesirably enters thereinto from the atmosphere.

Therefore, according to the present invention, the circulating blower 6 is disposed between the carbon dioxide generator 1 with a vary large pressure loss, and the scrubber 11 installed in the circulating path, whereby the positive pressure and negative pressure produced before and after the circulating blower 6 are respectively absorbed by the scrubber 11 and the carbon dioxide generator 1, with the interior of said refrigerator 10 not being affected by the blowing pressure of the blower 6, and thus, the pressure in the refrigerator becomes zero.

Accordingly, since the breather bag 14 maintains its normal size, it can fully absorb the variation of the pressure with respect to the temperature variation within the refrigerator 10. As a result, it becomes possible to suppress the increase or decrease of the pressure in the refrigerator 10, thereby to prevent the outflow of the CA gas or entry of the atmosphere into the refrigerator.

Figure 3:
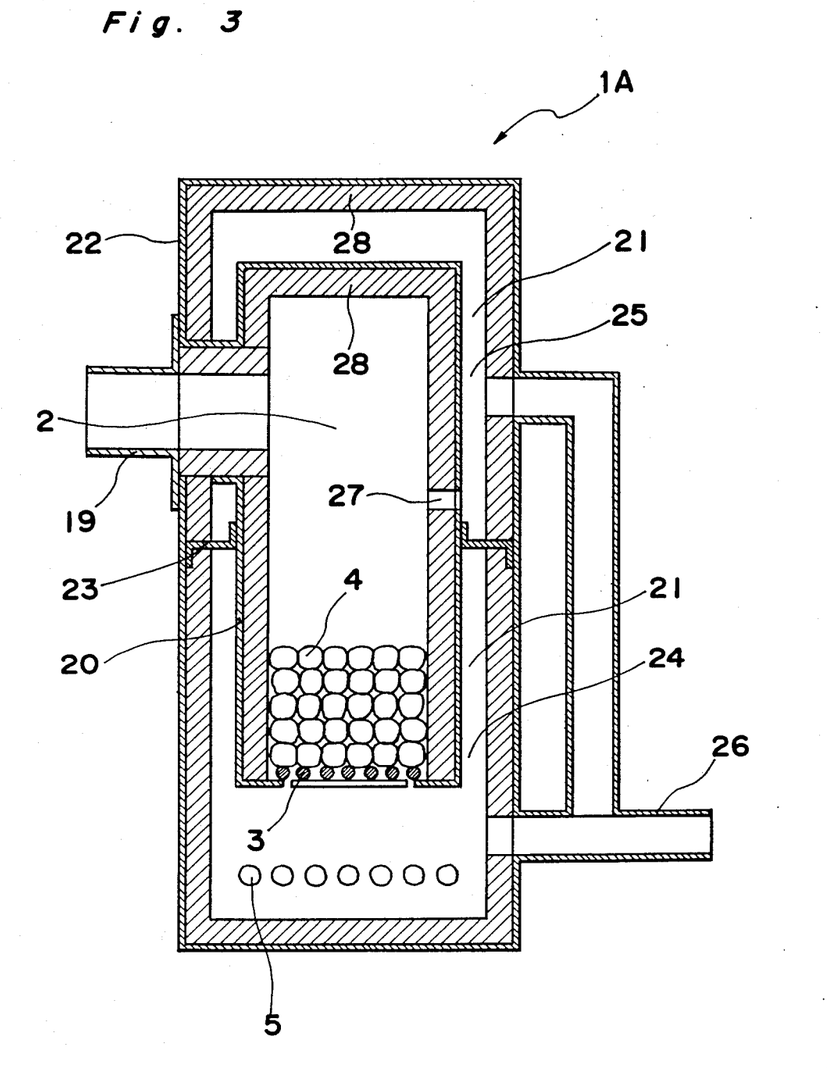
FIG. 3 is a side sectional view, showing on an enlarged scale, a detailed construction of a carbon dioxide generator which may be employed in the arranged of FIG. 1.

Referring particularly to FIG. 3, specific construction of the carbon dioxide generator will be described hereinbelow.

In FIG. 3, the carbon dioxide generator 1A generally includes an inner burning cylinder 20 having a grate 3 at its bottom portion, and an outer burning cylinder 22 surrounding said inner burning cylinder 20 through an air supply layer 21 defined therebetween and covering the entire outer periphery of said inner burning cylinder 20.

The air supply layer 21 is divided by a partition plate 23, into a primary air supply layer 24 at the lower portion and a secondary air supply layer 25 at the upper portion. There is provided an air supply pipe 26 divided to be connected to each of said two air supply layers 24 and 25 so as to supply the combustion air preheated by the air preheater (not shown here) into the respective air supply layers 24 and 25. The combustion air introduced into the primary air supply layer 24 at the lower portion serves to directly burn the carbon fuel through the grate 3, while the combustion air directed into the secondary air supply layer 25 at the upper portion flows into the inner burning cylinder 20 through a secondary combustion hole 27 formed on the side wall of the cylinder 20 to replenish the insufficient oxygen. Layers 28 of a heat insulating material are provided to cover the inner walls of the inner and outer cylinders 20 and 22. An exhaust pipe 19 extends through the inner and outer burning cylinders 20 and 22 for communication with said cylinder 20.

By the arrangement as described so far, the concentration of carbon dioxide in the air supply layer 21 is rapidly increased after the ignition. When the oxygen concentration within the refrigerator 10 is lowered by 1%, the carbon dioxide concentration is raised by 1%. During the above period, the scrubber (not shown here) referred to earlier is not operated in most cases. Since the oxygen concentration is approximately at 20% at this stage, the burning temperature is not very low.

However, carbon dioxide starts to absorb infrared rays sufficiently from the concentration at 1%. In other words, different from the normal air compositions such as nitrogen, oxygen, etc., carbon dioxide remarkably absorbs infrared rays. As compared with nitrogen and oxygen which are transparent with respect to almost any wavelength, carbon dioxide has several kinds of absorbing wavelength regions, and especially, in the infrared region of 4 to 5 $\mu$m, the emissivity becomes 0.8 even when the carbon dioxide concentration is only at 1%, and is almost close to that of a black body. Moreover, since the temperature of the carbon fuel 4 at the burning section reaches the temperatures in the region of 1000° to 1200° C., and the surface of the inner burning cylinder 20 made of a metallic material has the temperature of 80° to 500° C., said surface is turned into black by the oxidation, with the emissivity close to 1. Meanwhile, for the heat insulating material 28 applied over the inner face of the outer burning cylinder 22, a material which may readily reflect heat is preferable, and normally, ceramic fibers showing emissivity at about 0.6 to 0.7 are employed. Moreover, the main body of the outer cylinder 22 is made of stainless steel to be subjected to temperatures less than 300° C., and adapted to keep sufficient reflection on its surface, with a difficulty for heat radiation toward outer sides.

The temperature gradient as described above becomes more conspicuous by the heat insulating effect of the carbon dioxide contained in the air supply layer 21. In other words, this may be attributable to the fact that the heat radiation emitted from the inner burning cylinder 20 is readily absorbed by this carbon dioxide prior to arrival at the outer burning cylinder 22. Furthermore, the air of the air supply layer 21 raised in its temperature by the absorption of the above radiation, is introduced into the primary and secondary air supply layers through the grate 3 or the secondary burning hole 27 so as to act to raise the burning temperature. Accordingly, heat radiation from the burning section 2 is to be reduced. Since the inner burning cylinder 20 is at a considerably high temperature, the heat emission at this portion is effected at a higher rate by radiation than by convection and conduction, and owing to the fact that the air supply layer 21 at the carbon dioxide concentration of 0% allows the radiation to pass therethrough by almost 100%, the outer burning cylinder 22 was raised in temperature by approximately 30° C. If more carbon dioxide is contained in the air supply layer 21, the heat amount equivalent to the temperature rise of the outer burning cylinder 22 can be absorbed by the air supply layer 21, and thus, the burning temperature can be raised by that extent. As a result, the temperature of the carbon fuel 4 was at 950° C. at the composition of 3% for carbon dioxide, and 5% for oxygen, whereas it was only at 870° C. at the composition of 0% for carbon dioxide and 5% for oxygen. Needless to say, the above data were obtained when the air preheater 8 and the electric heater 5 where used under the same conditions, and circulating air at 600 liter/min. was caused to flow to 10 kg of black lead (20×20×45 mm) during oxygen concentration at 5%.

Accordingly, in the storage system of the present invention, since the burning temperature of the carbon fuel 4 can be maintained higher than in the conventional system, burning may be fully continued, even in a low oxygen concentration. Moreover, by the storage system of the present invention, since the heat capacity may be reduced, while the heat of the electric heater 5 spreads over the entire air supply layer 21 during the preheating, the carbon fuel 4 can be advantageously heated uniformly, with a consequent reduction of preheating time.

Figure 4:
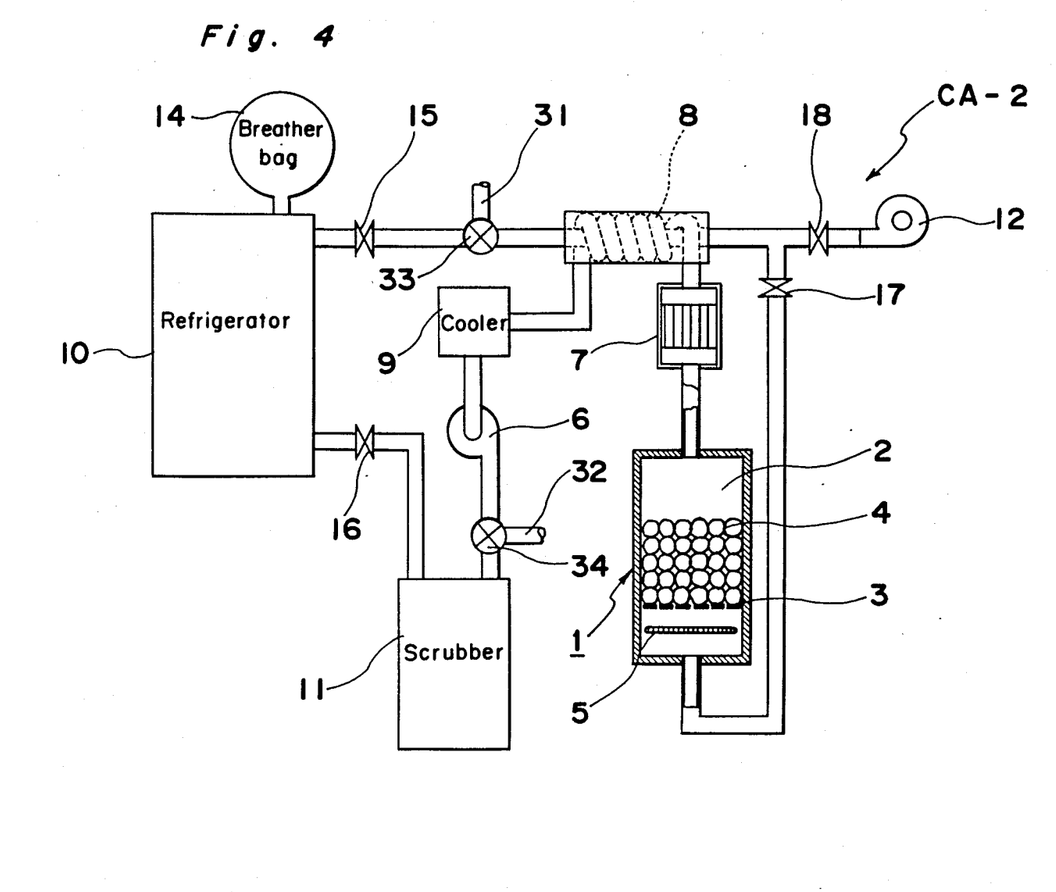
FIG. 4 is a diagram similar to FIG. 1, which particularly shows a modification thereof.

Referring further to FIG. 4, there is shown a modification of the CA storage system shown in FIG. 1. In the modification of FIG. 4, the CA storage system CA-2 further includes a suction port 31 having a suction valve 33 provided in the path between the refrigerator 10 and the carbon dioxide generator 1, and an exhaust port 32 having an exhaust valve 34 provided between the circulating fan 6 and the scrubber 11.

For starting, the CA storage system CA-2 of FIG. 4 is so arranged that the valve 15 provided in the path between the refrigerator 10 and the carbon dioxide generator 1, the valve 16 disposed in the path between the refrigerator 10 and the scrubber 11, and the valve 18 provided in the path for the oxygen supply blower 12 are closed, while the valve 17, the suction valve 33 for opening and closing the suction port 31 and the exhaust valve 34 for opening and closing the exhaust port 32 are opened for effecting the combustion, and when the burning furnace 2 has reached a predetermined temperature, the suction valve 31 and the exhaust valve 32 are closed, while the valves 15 and 16 are opened.

Generally, in a rainy season with high humidity or when the CA storage system was not operated for a long period, much moisture is contained in the heat insulating material 28 used for the burning furnace 2, etc. Therefore, a large amount of water vapor is produced from the heat insulating material during the preheating or immediately after starting of the combustion, and such water vapor condenses at portions of the circulating paths where the temperature is below the dew point so as to form water drops adhering to the pipe walls. SOx and NOx in the combustion gas are dissolved into such water drops for condensation so as to be nitric acid or sulfuric acid at high concentration which corrodes the pipe walls. Accordingly, during starting, the valve 15 disposed in the path between the refrigerator 10 and the carbon dioxide generator 1, the valve 16 provided in the path between the refrigerator 10 and the scrubber 11, and the valve 18 provided in the path for the oxygen supply blower 12 are closed, while the valve 17, the suction valve 33 for the suction port 31, and the exhaust valve 34 for the exhaust port 32 are opened as described above, whereby the circulating blower 6 takes in air from the atmosphere through the suction port 31 so as to supply the air to the carbon dioxide generator 1, and discharges the combustion gas generated in the burning furnace 2 into the atmosphere through the exhaust port 32. As a result, the water vapor generated from the insulating material is also discharged into the atmosphere through said exhaust port 32. Thus, after the burning furnace 2 has reached the temperature at which all the moisture contained in the insulating material is evaporated, the suction valve 33 and the exhaust valve 34 are closed, while the two valves 15 and 16 provided in the circulating path are opened, and thus, condensation of moisture in the circulating path is prevented, whereby generation of nitric acid and sulfuric acid, etc., is eliminated so as to prevent the pipe walls from being corroded for a longer life of the storage system.

Similarly, in the case where the CA storage system is started from the state where the oxygen concentration within the refrigerator 10 is low, the suction valve 33 provided in the suction port 31, the exhaust valve 34 provided in the exhaust port 32, the valve 15 disposed in the path between the refrigerator 10 and the carbon dioxide generator 1 and the valve 16 installed in the path between the refrigerator 10 and the scrubber 11 are suitably opened or closed, whereby the blower 6 takes in the normal air from the atmosphere through the suction port 31 so as to supply the air to the carbon dioxide generator 1, and discharges the combustion gas generated in the burning furnace 2 into the atmosphere via the exhaust port 32. In the above case, since the air used for the combustion is the air with oxygen concentration at 21% in the atmosphere, the combustion is started immediately when the combustion air preheated is brought into contact with the carbon fuel 4 at high temperature. Meanwhile, owing to the fact that the refrigerator 10 is cut off from the circulating path by the closing of the two valves 15 and 16, there is no possibility that the normal air with oxygen concentration of 21% enters the refrigerator 10 from the atmosphere, or that the air composition within the refrigerator 10 in which the oxygen concentration was particularly lowered, is undesirably altered.

Then, after the temperature in the burning furnace 2 and that of the carbon fuel 4 have been sufficiently raised, the suction valve 33 for the suction port 31 and the exhaust valve 34 for the exhaust port 32 are closed, with the two valves 15 and 16 provided in the circulating path being opened, whereby the air with a low oxygen concentration in the refrigerator 10 is supplied into the burning furnace 2.

Here, since the temperatures of the burning furnace 2 and the carbon fuel 4 are sufficiently raised by the combustion using the air with oxygen concentration at 21% in the atmosphere, temperature lower of the carbon fuel 4 by the combustion air can be limited to the minimum for the re-ignition under the low oxygen concentration.

Moreover, by providing the exhaust port 32 at the downstream side of the cooler 9, it becomes unnecessary to use a heat-resistant material for the exhaust valve 34 provided in the exhaust port 32, and thus, a very inexpensive valve may be used for the purpose. Furthermore, since the exhaust port 34 is located at the upstream side of the scrubber 11, water vapor generated by the evaporation of moisture contained in the heat insulating material at the initial stage of the starting of burning is not fed to the scrubber 11, but is discharged into the atmosphere. Therefore, the active carbon filled in the scrubber 11 is not subjected to moisture poisoning, and thus, the scrubber 11 is free from reduction in its capacity, even when the operation mode for the circulating cycle is entered.

Additionally, by providing the suction port 31 at the upstream side of the air preheater 8, it is possible to prevent an idle operation of the air preheater 8 for a longer life thereof.

It should be noted here, although the description has been made so far on the assumption that the change-over of the circulating path is effected when the temperature of the burning furnace 2 has reached a predetermined level, similar effect may be obtained even when the change-over of the circulating path is effected after lapse of a predetermined time, i.e., after lapse of time necessary for the combustion of the burning furnace 2 to be stabilized.

Referring back to FIG. 1, the ignition system of the CA storage system according to the present invention will be described hereinafter.

Commonly, the electric heater 5 is so arranged that the amount of current passing therethrough is controlled by the temperatures of said heater in order to protect the heater wire against breakage. Meanwhile, the temperature of the heater is determined by the amount of current passing therethrough and the amount of heat radiation. Therefore, if the heater temperature is controlled to be constant, the amount of current passing therethrough is varied to a large extent by the conditions of heat radiation of the heater.

During starting, if the carbon fuel 4 is preheated, with the circulating blower 6 being stopped, due to the fact that the heat emission of the electric heater 5 is based on the radiation and natural convection in the atmosphere, the heater temperature undesirably reaches the preset value at a stage at which the amount of current passing through the heater is comparatively small. Since the temperature of the carbon fuel 4 is mainly raised by the radiation of heat from the electric heater 5, the carbon fuel 4 successively reaches the temperature capable of burning from its lower layer. Although the transfer of heat from the lower layer to the upper layer of the carbon fuel 4 is effected by heat conduction, if the air flowing through the carbon fuel 4 is limited only to that based on the natural convection through heating by the electric heater, it takes a very long time before the carbon fuel 4 at the upper portion of the burning furnace 2 reaches the temperature capable of burning. Therefore, if it is so arranged that the combustion is effected by feeding the combustion air into the burning furnace 2 when the carbon fuel 4 at the lower portion of the burning furnace 2 has reached the temperature capable of burning, the reaction for converting carbon monoxide into carbon dioxide is suspended, upon contact of the combustion gas of the carbon fuel 4 at the lower portion of the burning furnace 2, with the carbon fuel 4 at a low temperature disposed at the upper portion of the burning furnace 2, and thus, a large amount of carbon monoxide is generated. Particularly, in the case where the carbon fuel sintered at high temperatures is employed as a fuel, the amount of generated carbon monoxide is considerably increased, with a consequent prolongation of time required for the burning furnace 2 to be stabilized.

Therefore, according to the present invention, at the starting, upon energization of the electric heater 5, the circulating blower 6 is operated simultaneously, whereby air is forcibly directed to the electric heater 5 from the preheating period so as to lower the temperature of said heater, and thus, the amount of current passing through the heater is increased as compared with that when air is not being moved. In this case, since supply of heat amount to the carbon fuel 4 is effected through radiation from the electric heater 5 and heat conduction by the circulating air heated up to the high temperature by the electric heater 5, more heat due to the heat conduction by the high temperature circulating air is to be supplied to the carbon fuel 4 as compared with the period without any movement of air. Accordingly, the temperature rise of the carbon fuel 4 becomes much quicker than that during absence of air movement, and the burning is started when the carbon fuel 4 has reached the temperature capable of burning. Meanwhile, since air at a high temperature due to heating by the electric heater flows through the carbon fuel 4, heat conduction to the carbon fuel 4 at the upper portion of the burning furnace 2 is expedited, different from the case based on the natural convection along during the absence of air movement.

In addition, since the temperature of the electric heater 5 is low immediately after starting, if it is so arranged that, as shown in FIG. 1, a temperature detecting section 5a is provided on the electric heater 5 for detecting the temperature thereof so as to operate the circulating blower 6 to increase its blowing air amount so that the output value at the temperature detecting portion 5a becomes constant, the amount of radiation from the electric heater 5 is maintained constant at all times for still more effective heating.

Moreover, during absence of air movement, the air preheater 8 has almost no effect at the preheating in the conventional system, but according to the present invention, even before starting of the combustion, the air after flowing through the carbon fuel 4 is subjected to heat-exchange at the air preheater 8 so as to be again fed back to the burning furnace 2, and thus, the carbon fuel 4 can be heated very efficiently.

Meanwhile, since air is to be circulated also to the purifying catalyst 7 by operating the circulating blower 6 from the starting, the energizing rate of the heater 7a for the catalyst 7 can also be increased, whereby the temperature rising of the purifying catalyst 7 can be further expedited for fully displaying the catalytic function of the catalyst 7. Moreover, since the heat applied by the heater 7a at the catalyst 7 is also subjected to the heat-exchange by the air preheater 8 and again fed back to the burning furnace 2, it is possible to heat the carbon fuel 4 very efficiently.

As is clear from the foregoing description, according to the CA storage system of the present invention, the carbon fuel 4 at the upper portion of the burning furnace 2 may be raised in its temperature comparatively rapidly, and the amount of carbon monoxide to be generated when the combustion gas for the carbon fuel 4 at the lower portion of the combustion furnace 2 is brought into contact with the carbon fuel 4 at the upper portion of the burning furnace 2 after starting of combustion, may be reduced to a large extent. Therefore, since the combustion gas at high temperatures may be supplied to the air preheater 8 in a short period of time, said air preheater fully displays its function for stabilization of the temperature within the burning furnace 2, and thus, time required for the stabilization of the combustion can be markedly shortened.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controlled atmosphere storage system which comprises a refrigerator, a carbon dioxide generator which burns a carbon fuel by a burning section provided therein for supplying carbon dioxide to said refrigerator, a purifying catalyst provided at the downstream side of said carbon dioxide generator, an air preheater provided at the downstream side of said purifying catalyst, a cooler provided at the downstream side of said air preheater, a circulating blower provided at the downstream side of said cooler for circulating air within said refrigerator, as air for combustion, into said carbon dioxide generator, a scrubber provided at the downstream side of said circulating blower for adjusting concentration of carbon dioxide by adsorbing the carbon dioxide for supplying into said refrigerator, and a circulating path which connects said scrubber and said refrigerator.

2. A controlled atmosphere storage system as claimed in claim 1, wherein said refrigerator is provided with a breather bag.

3. A controlled atmosphere storage system as claimed in claim 1, wherein said carbon dioxide generator further includes an air supply pipe for receiving combustion air from the interior of said refrigerator, an outer burning cylinder having its inner face formed by a heat insulating material, an inner burning cylinder generally, entirely surrounded by an air supply layer formed between said inner burning cylinder and said outer burning cylinder and also having an insulating material on its inner surface, a grate provided at a lower portion of said inner burning cylinder so as to place the carbon fuel thereon and also to feed the combustion air from the air supply layer therebelow to said carbon fuel, and an exhaust pipe open in said inner burning cylinder at an upper portion of the carbon fuel layer and extending through the air supply layer and said outer burning cylinder for circulating the exhaust air into said refrigerator.

4. A controlled atmosphere storage system as claimed in claim 1, further including a suction port having a suction valve provided in a path between the refrigerator and the carbon dioxide generator, and an exhaust port having an exhaust valve provided between the circulating blower and the scrubber, whereby during starting, a first valve provided in the path between the refrigerator and the carbon dioxide generator and a second valve provided in the path between the refrigerator and said scrubber are closed, while said suction port and said exhaust port are opened for effecting the burning, and after lapse of a predetermined period of time or upon arrival of the temperature at the burning section up to a predetermined temperature, said suction port and exhaust port are closed, with said first and second valves being opened.

5. A controlled atmosphere storage system as claimed in claim 4, wherein said carbon dioxide generator is further provided therein with a heater which is arranged to be heated during the starting, with said circulating blower being operated.

6. A controlled atmosphere storage system which comprises a refrigerator having a breather bag, a carbon dioxide generator which burns a carbon fuel by a burning section provided therein for supplying carbon dioxide to said refrigerator, a purifying catalyst provided at the downstream side of said carbon dioxide generator, an air preheater provided at the downstream side of said purifying catalyst, a cooler provided at the downstream side of said air preheater, a circulating blower provided at the downstream side of said cooler for circulating air within said refrigerator, as air for combustion, into said carbon dioxide generator, a scrubber provided at the downstream side of said circulating blower for adjusting concentration of carbon dioxide by adsorbing the carbon dioxide for supplying into said refrigerator, and a circulating path which connects said scrubber and said refrigerator, a suction port having a suction valve provided in a path between the refrigerator and the carbon dioxide generator, and an exhaust port having an exhaust valve provided between the circulating fan and the scrubber, an oxygen concentration detector provided within said refrigerator, a first valve provided in the path between the refrigerator and the carbon dioxide generator and a second valve provided in the path between the refrigerator and said scrubber, whereby if the oxygen concentration in the refrigerator is below the predetermined value, the first valve provided in the path between the refrigerator and the carbon dioxide generator and the second valve provided in the path between the refrigerator and said scrubber 11 are closed during the starting, while said suction port and said exhaust port are opened for effecting the burning, and after lapse of a predetermined period of time, said suction port and exhaust port are closed, with said first and second valves being opened.

7. A controlled atmosphere storage system which comprises a refrigerator having a breather bag, a carbon dioxide generator which burns a carbon fuel by a burning section provided therein for supplying carbon dioxide to said refrigerator, a purifying catalyst provided at the downstream side of said carbon dioxide generator, an air preheater provided at the downstream side of said purifying catalyst, a cooler provided at the downstream side of said air preheater, a circulating blower provided at the downstream side of said cooler for circulating air within said refrigerator, as air for combustion, into said carbon dioxide generator, a scrubber provided at the downstream side of said circulating blower for adjusting concentration of carbon dioxide by adsorbing the carbon dioxide for supplying into said refrigerator, and a coupling path which connects said scrubber and said refrigerator, an oxygen supplying blower for supplying oxygen in the atmosphere into said refrigerator, and an oxygen concentration detector provided within said refrigerator, said oxygen supplying blower being arranged to be operated when the oxygen concentration within the refrigerator falls below a preset value.

* * * * *